United States Patent [19]

Hagman et al.

[11] Patent Number: 5,450,908
[45] Date of Patent: Sep. 19, 1995

[54] SPRING-CUSHIONED HYDRAULIC DEPTH CONTROL SYSTEM FOR TILLAGE IMPLEMENTS

[75] Inventors: Rodney L. Hagman, Buhler; Bill J. Pfenninger, Hutchinson, both of Kans.

[73] Assignee: Krause Plow Corporation, Inc., Hutchinson, Kans.

[21] Appl. No.: 47,638

[22] Filed: Apr. 14, 1993

[51] Int. Cl.⁶ .............................................. A01B 63/22
[52] U.S. Cl. .................. 172/239; 172/311; 172/464; 172/264; 172/317; 267/34
[58] Field of Search .................. 267/34, 71, 223, 248; 92/130 C, 166, 66; 172/140, 500, 501, 506, 239, 317, 464, 423, 424, 263, 264, 660, 664, 311, 310, 413, 4

[56] References Cited

U.S. PATENT DOCUMENTS

| | | | |
|---|---|---|---|
| 3,266,230 | 8/1966 | Rowbotham | 172/506 |
| 3,583,284 | 6/1971 | Ryan | 172/464 |
| 3,663,032 | 5/1972 | Hook et al. | 172/239 |
| 4,506,898 | 3/1985 | Herron . | |
| 4,553,608 | 11/1985 | Miskin | 172/464 |
| 4,724,910 | 2/1988 | Wheeler | 172/464 |
| 4,736,931 | 4/1988 | Christopherson | 267/34 |
| 4,762,183 | 8/1988 | Bourgault et al. | 172/413 |
| 4,821,806 | 4/1989 | Winter | 172/4 |
| 4,828,237 | 5/1989 | Neff | 267/34 |
| 4,840,233 | 6/1989 | Friggstad | 172/311 |
| 4,883,127 | 11/1989 | Chevrier | 172/500 |
| 4,930,580 | 6/1990 | Fuss et al. | 172/464 |
| 4,967,851 | 11/1990 | Barber | 172/311 |
| 5,161,622 | 11/1992 | Godbersen | 172/178 |
| 5,255,591 | 10/1993 | Gottlieb | 92/66 |

FOREIGN PATENT DOCUMENTS

| | | | |
|---|---|---|---|
| 268314 | 11/1964 | Australia | 172/317 |
| 635406 | 1/1962 | Canada | 172/264 |
| 2568088 | 1/1986 | France | 172/317 |
| 834417 | 5/1960 | United Kingdom | 172/264 |

OTHER PUBLICATIONS

Krause Brochure "Landsman" Rigid, 10–15 Ft.; 3 Section, 18–31 Ft., 5 Section, 36–42 Ft.; 6100 Series One-Trip Tillage Implement, Form No. KR5M1292.

*Primary Examiner*—Eric K. Nicholson
*Attorney, Agent, or Firm*—Hovey, Williams, Timmons & Collins

[57] ABSTRACT

A tillage implement has its residue incorporating gangs of discs hydraulically adjustable on-the-go to vary the extent of residue incorporation. Cylinders connected with the gangs are of matching volumetric capacities and are connected in a series hydraulic arrangement so that all of the cylinders operate in unison and in equal amounts. Each cylinder has a rod that extends through the entire length of the cylinder and projects outwardly from opposite ends thereof. Each cylinder is also provided with a relief spring coiled about its exterior and trapped between a lower shoulder on the cylinder and an upper slip collar that is trunnion-mounted to the attaching bracket of the implement frame, thus permitting the cylinder to slip upwardly through the collar under the resistance of the relief spring when an obstacle is encountered by the incorporating discs.

14 Claims, 2 Drawing Sheets

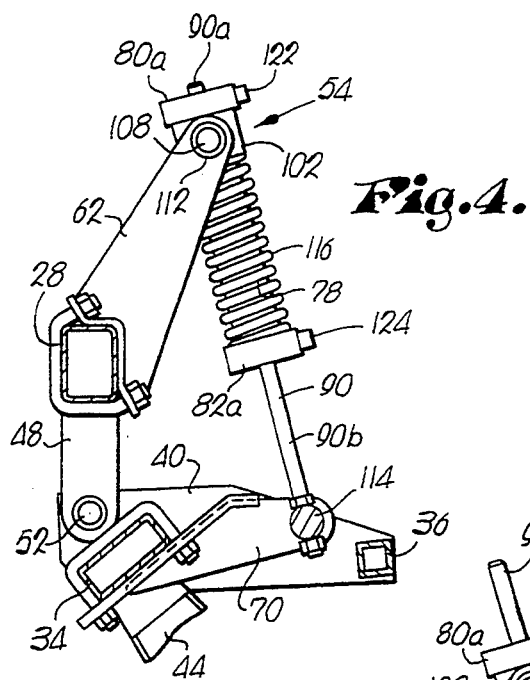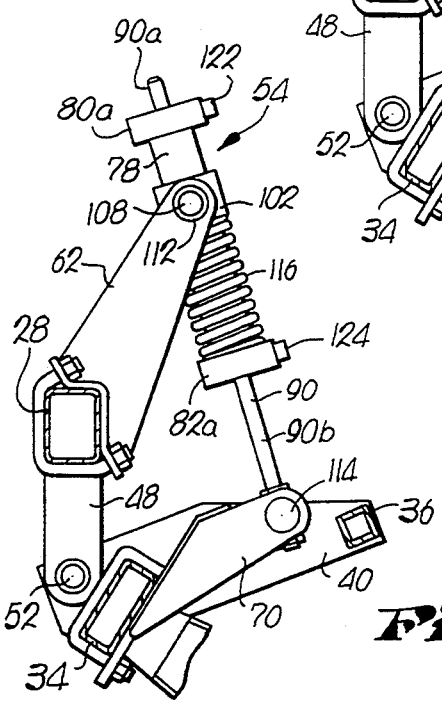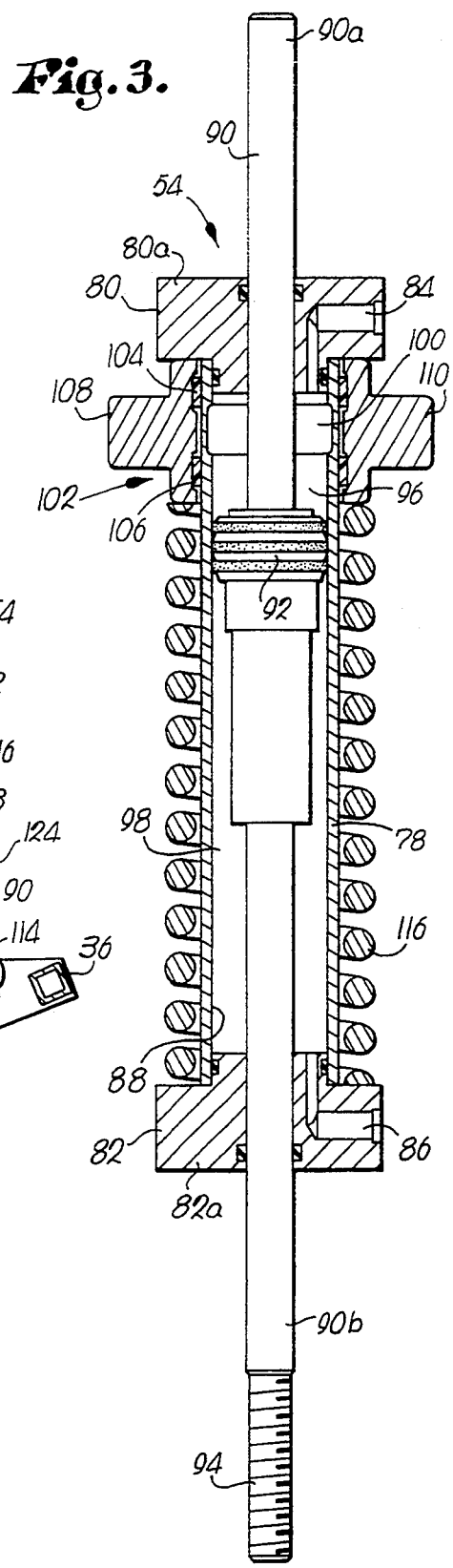

SPRING-CUSHIONED HYDRAULIC DEPTH CONTROL SYSTEM FOR TILLAGE IMPLEMENTS

TECHNICAL FIELD

The present invention relates to the field of tillage implements and, more particularly, to implements of the type in which the depth of residue incorporating tools such as a gang of discs can be adjusted relative to the depth of other tillage tools on the machine so that the farmer can more easily comply with residue management guidelines for his particular fields.

BACKGROUND

As government guidelines become increasingly strict regarding the amount of residue that must be left on the surface of certain highly erodible fields in order to comply with conservation standards, the farmer is faced with the need to not only comply with those guidelines in general, but also to comply with them with regard to each specific type of land under consideration. In other words, some lands may be more highly erodible than others and thus may give rise to the need to leave a relatively high percentage of residue on the surface of the field being tilled. Others may require a considerably lower percentage of surface residue, permitting greater incorporation.

Thus, the farmer needs to be able to adjust his equipment and his practices to accommodate the needs and restrictions of his different field conditions. Moreover, it would be desirable it he could do so quickly and easily from the tractor seat.

SUMMARY OF DISCLOSURE

Accordingly, one important object of the present invention is to provide a depth control system which the farmer can operate from the tractor seat to adjust the depth of the residue incorporation tools on the implement relative to other tillage tools thereof so as to increase efficiency and promote good soil conservation practices.

Another important object of the present invention is to provide such a remotely operated depth control system which is also provided with spring relief protection for the tools at all adjusted depth positions thereof.

Yet another important object of the present invention is to provide a novel spring-cushioned hydraulic cylinder which is useful in carrying out the foregoing objects and wherein the cylinder extends and contracts in the usual manner to carry out the necessary adjusting movements, but is capable of bodily shifting in a relief movement against the resistance of a relief spring if such sudden yielding movement becomes necessary due to the tools striking an obstruction or other object.

A still further important object of the present invention is to provide a system of depth control cylinders for the incorporation tools which are arranged in a series fluid flow relationship utilizing cylinders of identical volumes and piston rods extending from both ends of each hydraulic unit so there is no need to progressively downsize successive cylinders in the series as is commonly necessary in conventional master-slave series systems.

In carrying out the foregoing and other objects of the present invention, it is contemplated that the residue incorporating tools in an implement constructed in accordance with the principles of the present invention may, for example, take the form of a series of discs arranged in a "gang" which is hydraulically raised and lowered to a variable extent relative to the main chassis or frame of the implement, which is itself height controlled by suitable hydraulic cylinders associated with the ground wheel arms of the implement. In practice, at least a pair of converging gangs of the discs may be provided adjacent the front end of the machine on opposite sides of the fore-and-aft centerline thereof, with each gang independently swingable up and down relative to the frame. One or more power units or cylinders are utilized for each gang, but all of the units are hydraulically connected in the same series circuit with the volumes of the cylinders of all the units being identical to one another. The rods associated with all of the units pass entirely through the cylinders so as to define equal volume chambers on opposite sides of the piston within each cylinder, permitting the interconnected chambers between successive cylinders in the series to be identically matched with one another so as to avoid the need for progressive downsizing of the cylinders.

Each hydraulic unit in the series is fixedly secured at one end to the gang of tools but is slip-coupled at its opposite end to a bracket on the frame and there is a coil spring associated with the slip coupling that yieldably holds the cylinder against slippage relative to the bracket. However, when an obstacle is suddenly encountered by the tool, relief movement is permitted as the entire body of the cylinder slips up through the ring-like coupling against the resistance of the relief spring while the rod of the cylinder remains extended and the unit functions at this time as a stiff strut. The slip coupling is preferably configured in the form of a collar having integral trunnions so that in addition to the slipping function, the collar permits the power unit to rock to the extent necessary to accommodate the swinging movement of the tools about an arc as they are raised and lowered.

BRIEF DESCRIPTION OF THE DRAWINGS

FIG. 3 is an enlarged longitudinal, cross-sectional view of one of the spring-cushioned hydraulic piston and cylinder units of the present invention illustrating details of construction;

FIG. 4 is a fragmentary, fore-and-aft cross-sectional view through the front of the implement illustrating one of the piston and cylinder units in a fully extended position with the tools lowered to their maximum extent;

FIG. 5 is a cross-sectional view of the implement similar to FIG. 4, but showing the rod of the illustrated unit fully retracted so as to raise the tools; and FIG. 6 is a cross-sectional view similar to FIGS. 4 and 5 with the rod of the unit almost fully extended but also illustrating the spring-cushioned relief action which is available as the cylinder compresses the relief spring and slips upwardly in the slide collar when an obstruction is encountered by the tools.

DETAILED DESCRIPTION

Figure 1:
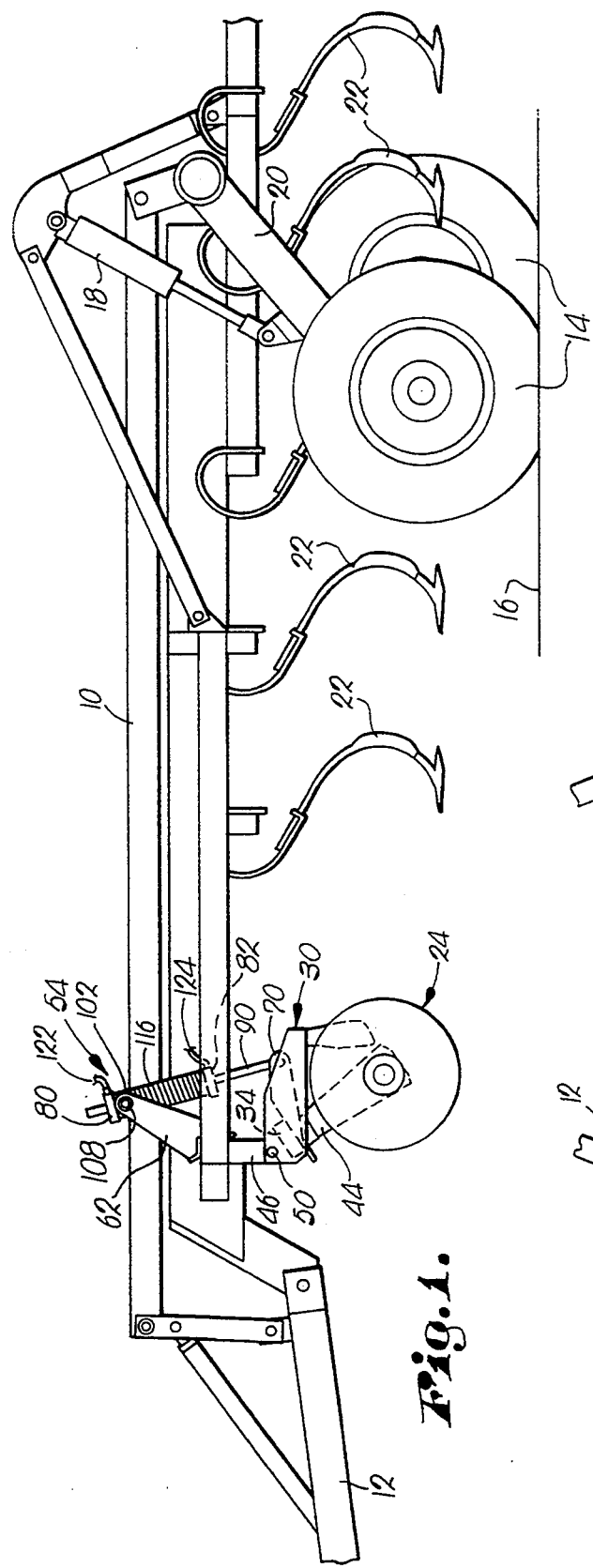
FIG. 1 is a fragmentary side elevational view of a tillage implement incorporating a spring-cushioned hydraulic depth control system in accordance with the principles of the present invention.
Figure 2:
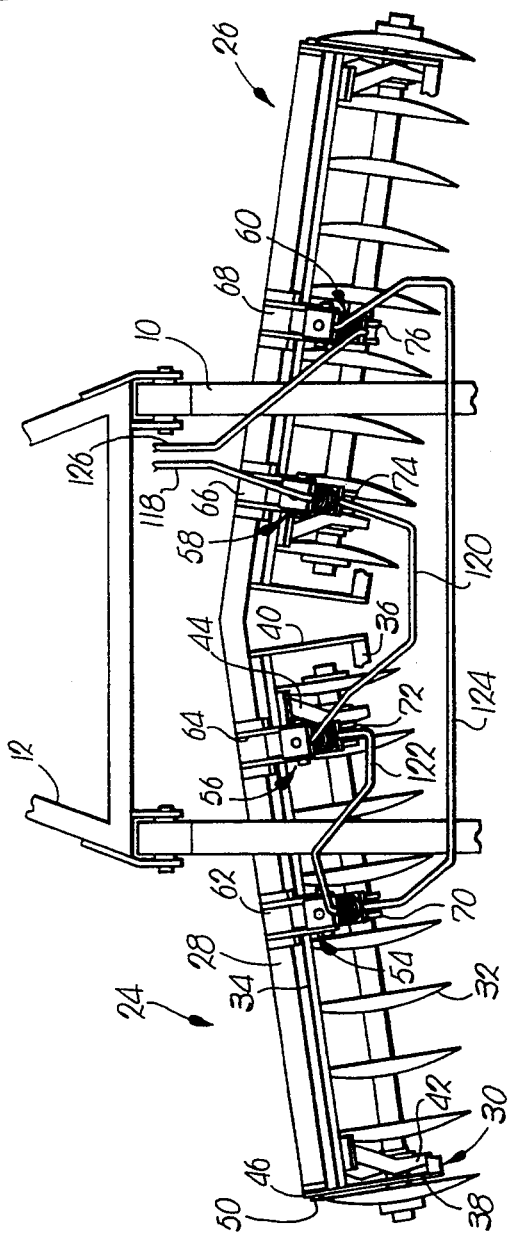
FIG. 2 is a fragmentary top plan view thereof illustrating the manner in which hydraulic piston and cylinder units of the system are connected in a series fluid flow relationship with one another.

The implement illustrated in FIGS. 1 and 2 has a main frame 10 that includes a tongue portion 12 adapted for coupling at its front end with a towing tractor (not shown). As is well understood by those skilled in the art, the tractor is not only the source of motive power for pulling the implement across the field, but also is the source of pressurized hydraulic fluid for raising and lowering ground wheels 14 relative to the frame 10 for adjusting the height of the latter above the ground 16. Hydraulic cylinders 18 of conventional design may be connected between the frame 10 and the vertically swingable arms 20 of the ground wheels 14 for carrying out the frame raising and lowering action.

The frame 10 may be provided with a number of different tools thereon for purposes of tilling the soil as the implement is drawn across the field. In the illustrated embodiment, the frame 20 has been provided with a number of tillage shanks 22 which are fixedly attached at their upper ends to the frame 10 and obtain their depth setting by adjustment of the height of the entire frame 10 via the wheel cylinders 18. Additionally, in accordance with the present invention, the frame 10 may be provided with two gangs 24 and 26 of residue incorporating discs which are depth adjustable independently of the frame 10 and relative to the shanks 22. In a preferred form of the invention, the disc gangs 24 and 26 may be adjusted from several inches above the lower ends of the shanks 22 to a position several inches below the bottom ends of the shanks.

Turning to the disc gangs 24 and 26 in more detail, it will be seen that in the illustrated embodiment, the frame 10 includes a front transverse beam 28 that is bent at the middle to form an apex from two forwardly converging wing portions (see FIG. 2). Each of the gangs 24,26 suspended from the beam 28 includes an open, box-like frame 30 and a line of concavo-convex disc blades 32 supported by the box frame 30. Box frame 30 includes a forward tubular box beam 34, a smaller, rear box beam 36 extending parallel to the forward box beam 30, and a pair of opposite end plates 38 and 40 that rigidly interconnect the beams 34,36. Struts 42 and 44 slightly inboard of opposite ones of the end plates 38 and 40 are rigidly affixed to the forward box beam 34 and extend downwardly and rearwardly therefrom to carry the line of discs 32.

The front beam 28 has at least two downwardly projecting lugs 46 and 48 at opposite ends of each wing portion thereof for purposes of pivotally attaching the box frame 30 thereto. Transverse, horizontal, aligned pivots 50 and 52 at the bottom ends of the lugs 46 and 48, respectively, accomplish the desired pivotal connection with each box frame 30, and thus with each disc gang 24,26. The up and down position of the gangs 24,26 about the pivots 50,52 is determined by four fluid pressure piston and cylinder power units 54,56,58, and 60, the power units 54–60 being mechanically connected between upstanding brackets 62,64, 66, and 68 on the front beam 28 and a set of four, rearwardly extending crank arms 70,72,74, and 76 on the box beam 34 which are vertically aligned with corresponding ones of the brackets 62–68. FIGS. 3–6 illustrate details of construction of one of the spring cushioned power units 54 and its manner of operation.

The unit 54 includes an elongated cylinder 78 having a pair of blocks 80 and 82 at opposite ends thereof that close such otherwise open ends. Each of the blocks 80,82 is provided with a port 84 or 86 that communicates the exterior of the unit 54 with an interior bore 88 of the cylinder 78. A long rod 90 having a piston 92 intermediate its opposite ends reciprocates within the bore 88 and projects outwardly beyond opposite ends thereof. One section 90a of the rod 90 is telescopically received by the block 80, while the opposite end section 90b is telescopically received by the block 82. As shown in FIG. 3, the lower end of section 90b carries a series of threads 94.

The piston 92 divides the bore 88 into a pair of opposite chambers 96 and 98 which communicate with respective ports 84 and 86. An annular, internal groove 100 in the bore 88 near the block 80 serves as a rephasing means for the cylinder 54 when the rod 90 is in its full upstroke with the piston 92 adjacent the block 80 and located at the groove 100 so as to allow the rephasing passage of pressurized oil from the chamber 98 to the chamber 96 in a manner well understood by those skilled in the art. While normally the piston 92 does not allow significant leakage of oil past its peripheral surfaces, when the piston 92 is located at the groove 100, the piston 92 is unable to make complete sealing contact with the normal surface of the bore 88, allowing the bypass or rephasing leakage as above mentioned.

The two blocks 80 and 82 have respective head portions 80a and 82a that are enlarged with respect to the external diameter of the cylinder 78 so as to project radially outwardly beyond the outside diameter of the cylinder 78. Thus, the head portions 80a and 82a serve as opposite stop or shoulder surfaces for structure trapped between such surfaces, as will now be explained.

In particular, it will first be noted that an annular slip collar 102 encircles the cylinder 78 adjacent the block 80 and is provided with a pair of internal bushing rings 104 and 106 that adapt the collar 102 to slidably receive the cylinder 78. A pair of oppositely projecting trunnions 108 and 110 on the collar 102 are journaled in corresponding bushings 112 in the upper end of each of the brackets 54–60 so as to rockably secure the power units 54–62 to their respective brackets 62–68. The threaded portion 94 of each rod 90 is secured to a swiveling cross-pivot 114 on the crank arms 70–76 as illustrated with respect to the crank arm 70 in FIGS. 4–6.

The collar 102 normally butts up against the head portion 80a of the block 80 such that the block 80 serves as a limit stop for the collar 102 with respect to movement of the latter upwardly along the cylinder 78 in a direction toward the block 80. Trapped between the opposite side of the collar 102 and the lower block 82 is a coiled, helical relief spring 116 that bears downwardly against the enlarged head portion 82a of the block 82. Thus, the head portion 82a of the block 82 serves as a shoulder for the spring 116 and prevents its escape from the lower end of the cylinder 78. It will be seen that the collar 82 is slidable along the cylinder 78 toward and away from the opposite end blocks 80 and 82, compressing and decompressing the spring 116.

In the preferred embodiment, the cylinders 78 of the power units 54–60 are plumbed in a series hydraulic fluid flow arrangement as illustrated in FIG. 2. As illustrated in that figure, the hydraulic circuit includes a first line 118 leading from a source of hydraulic fluid on the towing tractor (not shown) and controlled by a suitable selector valve. The line 118 is connected to the port 84 of the power unit 58. A second hydraulic line 120 leads from the port 86 of the power unit 58 to the port 84 of the next successive power unit 56. A third line 122 connects the port 86 of the power unit 56 with the port 84 of the power unit 54, while a fourth longer line 124 connects the port 86 of the power unit 54 with the port 84 of the power unit 60. A fifth line 126 leads from the port 86 of the power unit 60 back to the control valve at the tractor. As a consequence of this arrangement, it will be seen that the chamber 98 of each cylinder 78 is hydraulically connected to the chamber 96 of the next successive cylinder 78 in the series. Consequently, as oil is forced out of the chambers 98, it is directed into the next successive chamber 96. And since both chambers 96 and 98 of each cylinder 78 have rods therein which take up essentially the same volumetric space, the working volumes of the two chambers 96 and 98 are essentially the same from one cylinder 78 to the next, causing successive chambers in the series to be matched hydraulically. Consequently, the fluid displaced from one chamber is the same volume as that required to fill the next successive chamber in the series such that the power units all stay in essentially synchronous relationship with one another during operation. To the extent that they may become slightly out of phase, they can be resynchronized by merely retracting the pistons 92 completely to their upper ends to the rephasing grooves 100, which will allow the hydraulic circuit within the system to redistribute itself in the proper manner to resynchronize all of the units.

OPERATION

When the implement is to be transported from one field to another, or the tools of the machine are otherwise to be completely lifted out of the ground, the wheel cylinders 18 are fully extended such that the frame 10 is elevated to the position illustrated in FIG. 1. This causes the shanks 22 to be completely raised above the ground 16, as well as the disc gangs 24 and 26, regardless of the extent of retraction or extension of the power units 54-60.

While the shanks 22 are raised in this manner, or when they are in the ground if the farmer prefers to operate the machine in that manner, the depth of the disc gangs 24 and 26 relative to the shanks 22 may be adjusted by appropriately hydraulically operating the power units 54-60. In the FIG. 1 illustration, the disc gangs 24 are fully lowered to a position in which the bottom of the discs are several inches below the bottom of the shanks 22, although it is to be understood that the discs 24 and their companion discs 26 can be adjustably raised to a position several inches above the bottom the shanks 22 if desired. The hydraulic valving common to farm tractors and well understood by those skilled in the art is operable to hydraulically lock the rods 90 of the power units 54-60 in any selected position of telescopic extension, depending upon operator preference. Thus, when the wheel cylinders 18 are retracted, the frame 10 is lowered toward the ground 16, placing all of the tools into their desired amount of ground engagement. In the event the operator wishes to change the amount of residue incorporation on-the-go, he need only actuate the hydraulic power units 54-60 in the necessary direction, at which time all of the units will be actuated simultaneously and to the same extent as a result of their series relationship and their matching volumes.

In FIG. 4, the power unit 54 is illustrated as being fully extended corresponding to the condition of things in FIG. 1. On the other hand, if it is desired to raise the gangs 24,26, the internal piston 92 of each unit is retracted so that each rod 90 is pulled up at the bottom and projects further upwardly through the top of the unit, as illustrated in FIG. 5.

It will be noted that due to the presence of the relief spring 116 between the slip collar 102 and the shoulder 82, the cylinder 78 stays extended relative to the slip collar 102 as illustrated in FIGS. 4 and 5, even during pressurized injection of the hydraulic fluid into the bore 88 of the cylinder 78 in different directions during operation. In other words, due to the reaction forces created by the hydraulic fluid as it operates against the piston 92 and the opposite blocks 80 and 82 at the end of each cylinder 78, there is a tendency for the cylinder 78 to slip back and forth within the collar instead of, or at least prior to, moving the piston 92 relative to the cylinder 78. However, the force of the relief spring 116 is high enough to overcome this tendency such that the reaction forces from the hydraulic pressures do not themselves cause any such movement of the cylinder 78 within the slip collar 102.

However, in the event one or both of the disc gangs 24,26 encounters an obstacle, such gang is free to swing upwardly against the action of the relief spring or springs 116 as illustrated in FIG. 6, during which time the cylinder 78 of the involved power units slips up through the slip collar 102 as the spring 116 compresses. There is no displacement of hydraulic fluid at this time, the cylinder 78 and its rod 90 functioning as a rigid strut during such action, it being noted that the rod 90 in FIG. 6 is illustrated as having been adjusted slightly from the position of FIG. 4 corresponding to a slightly raised position from that figure. As soon as the obstacle is cleared, the relief spring or springs 116 will return the involved cylinders 78 downwardly through the slip collar or collars 102, reestablishing the previously selected depth for the involved disc gangs.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a tillage implement having a mobile frame and a set of ground-working tools mounted on the frame for adjusting up-and-down movement to a plurality of adjusted positions relative to the frame, the improvement comprising:

power means including a hydraulic power unit operably connected to the set of tools for effecting said adjusting movement thereof; and a relief spring assembly operably coupled between the power means and the frame for permitting the set of tools to yield upwardly when obstacles are encountered by the tools, said relief spring assembly being disposed to cause its biasing force for the tools to remain substantially unchanged when the tools are adjustably moved by the power unit from one of said adjusted positions to another.

2. In a tillage implement as claimed in claim 1,
said power unit including a pair of mutually relatively extendible and retractable parts,
one of said parts being connected to the set of tools and the other of said parts being connected to said relief spring assembly.

3. In a tillage implement as claimed in claim 2,
said one part comprising a rod and the other part comprising an elongated cylinder that telescopically receives said rod.

4. In a tillage implement as claimed in claim 2,
said relief spring assembly including a collar secured to the frame,
said other part being shiftable relative to said collar and being provided with a shoulder secured thereto for shifting movement therewith,
said relief spring assembly further including a spring trapped between said collar and said shoulder for yieldably biasing the shoulder away from the collar.

5. In a tillage implement having a mobile frame and a set of ground-working tools mounted on the frame for adjusting up-and-down movement relative to the frame, the improvement comprising:
power means including a hydraulic power unit operably connected to the set of tools for effecting said adjusting movement thereof; and
a relief spring assembly operably coupled between the power means and the frame for permitting the set of tools to yield upwardly when obstacles are encountered by the tools,
said power unit including a pair of mutually relatively extendible and retractable parts, one of said parts being connected to the set of tools and the other of said parts being connected to said relief spring assembly,
said relief spring assembly including a collar secured to the frame, said other part being shiftable relative to said collar and being provided with a shoulder secured thereto for shifting movement therewith, said relief spring assembly further including a spring trapped between said collar and said shoulder for yieldably biasing the shoulder away from the collar,
said other part of the power unit comprising a cylinder slidable axially through the collar and having said shoulder located adjacent one end of the cylinder in spaced relation to said collar, said spring comprising a coiled compression spring encircling the cylinder between the collar and the shoulder.

6. In a tillage implement as claimed in claim 5,
said cylinder having a stop adjacent the end thereof which is opposite said one end,
said collar being disposed between the stop and the spring with the stop located to abuttingly engage the collar and thereby limit the amount the cylinder is extended from the collar by the spring.

7. In a tillage implement as claimed in claim 6,
said collar being provided with trunnion means for rockably securing the collar to the frame.

8. In a tillage implement as claimed in claim 6,
said one part of the power unit comprising a rod telescopically received within said cylinder,
said rod projecting outwardly beyond opposite ends of the cylinder and having a piston within the cylinder intermediate said ends,
said shoulder and said stop having ports therein communicating with respective chambers defined within the cylinder on opposite sides of the piston.

9. A spring cushion hydraulic power unit comprising:
an elongated cylinder;
a rod telescopically received within said cylinder for extension and retraction therefrom in response to the pressurized flow of hydraulic fluid into and out of the cylinder;
a slip collar telescopically receiving said cylinder adjacent one end of the cylinder;
a shoulder on the cylinder adjacent an opposite end of the cylinder;
a helical compression spring encircling the cylinder between said slip collar and the shoulder for yieldably biasing the cylinder and the shoulder away from the collar; and
fluid inlet and outlet means for said pressurized flow of hydraulic fluid into and out of the cylinder.

10. A spring cushion hydraulic power unit as claimed in claim 9; and
a stop adjacent said one end of the cylinder in such a position that the slip collar is disposed between the stop and the spring such that the stop abuttingly engages the collar when the cylinder is fully extended from the collar.

11. A spring cushion hydraulic power unit as claimed in claim 10,
said collar having trunnion means associated therewith.

12. A spring cushion hydraulic power unit as claimed in claim 10,
said stop closing off said one end of the cylinder and said shoulder closing off the opposite end of the cylinder,
said rod extending telescopically through said stop and said shoulder and outwardly beyond opposite ends of the cylinder.

13. A spring cushion hydraulic power unit as claimed in claim 12,
said rod having a piston thereon between opposite ends of the cylinders
said stop and said shoulder having respective ports therein communicating with corresponding chambers on opposite sides of the piston.

14. In a tillage implement as claimed in claim 8,
said power means further including a plurality of additional power units of the same construction as the first-mentioned power unit and connected to the set of tools,
the cylinders of all of said power units being of identical volumes and connected in a series fluid flow relationship,
at least one chamber of each cylinder in the series being connected hydraulically to a chamber of the next adjacent cylinder in the series.

* * * * *